(12) United States Patent
Zhu

(10) Patent No.: US 12,475,434 B2
(45) Date of Patent: Nov. 18, 2025

(54) METHOD FOR PROCESSING WAREHOUSE ORDER TASK, STORAGE MEDIUM, AND ELECTRONIC DEVICE

(71) Applicant: Beijing Jingdong Zhenshi Information Technology Co., Ltd., Beijing (CN)

(72) Inventor: Ying Zhu, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 190 days.

(21) Appl. No.: 18/553,047

(22) PCT Filed: Dec. 7, 2021

(86) PCT No.: PCT/CN2021/136174
§ 371 (c)(1),
(2) Date: Sep. 28, 2023

(87) PCT Pub. No.: WO2022/206009
PCT Pub. Date: Oct. 6, 2022

(65) Prior Publication Data
US 2024/0193542 A1 Jun. 13, 2024

(30) Foreign Application Priority Data
Mar. 30, 2021 (CN) .......................... 202110354599.9

(51) Int. Cl.
*G06Q 10/087* (2023.01)
*G06Q 10/0631* (2023.01)
(52) U.S. Cl.
CPC ..... *G06Q 10/087* (2013.01); *G06Q 10/06311* (2013.01)
(58) Field of Classification Search
CPC ........... G06Q 10/087; G06Q 10/06311; G06Q 10/06; G06Q 10/06315; G06Q 10/06316; G06Q 10/08; G06Q 10/083; G06F 17/11
See application file for complete search history.

(56) References Cited

U.S. PATENT DOCUMENTS 11,074,547 B2 * 7/2021 Rajkhowa ............ G06Q 10/087
12,033,113 B2 * 7/2024 Gupta ................ G05B 19/4189
(Continued)

FOREIGN PATENT DOCUMENTS

CN 104881768 A 9/2015
CN 110728483 A 1/2020
(Continued)

OTHER PUBLICATIONS

International Search Report dated Mar. 3, 2022 of International Application No. PCT/CN2021/136174.
(Continued)

*Primary Examiner* — Garcia Ade
(74) *Attorney, Agent, or Firm* — Qinghong Xu

(57) ABSTRACT

A method for processing a warehouse order task, comprising: determining a production end time of an order to be processed; determining a production period of a batch task that the order to be processed belongs to; determining whether to issue the order to be processed to a picking pool according to the production end time and the production period; in response to determining not to issue the order to be processed to the picking pool, assigning the order to be processed to a picking terminal according to a backlog quantity of orders to be outbound and an outbound productivity; and in response to determining to issue the order to be processed to the picking pool, assigning the order to be processed to a picking terminal according to an order quantity of the batch task and a batch completion efficiency.

17 Claims, 7 Drawing Sheets

(56) References Cited

U.S. PATENT DOCUMENTS

| | | | |
|---|---|---|---|
| 2018/0127211 A1 | 5/2018 | Jarvis et al. | |
| 2018/0182054 A1* | 6/2018 | Yao | G06Q 10/063112 |
| 2020/0043080 A1 | 2/2020 | Shi | |
| 2020/0327606 A1* | 10/2020 | Rajkhowa | G06Q 30/0635 |
| 2021/0019815 A1 | 1/2021 | Rajkhowa et al. | |
| 2021/0110334 A1* | 4/2021 | Singh | G06Q 10/087 |
| 2021/0334682 A1* | 10/2021 | Darmour | G06N 3/08 |
| 2025/0074704 A1* | 3/2025 | Schubilske | B65G 1/1371 |

FOREIGN PATENT DOCUMENTS

| | | |
|---|---|---|
| CN | 111626652 A | 9/2020 |
| CN | 112070330 A | 12/2020 |
| CN | 113065823 A | 7/2021 |

OTHER PUBLICATIONS

Extended European Search Report dated Mar. 4, 2025 of European Application No. 21934645.9.

* cited by examiner

METHOD FOR PROCESSING WAREHOUSE ORDER TASK, STORAGE MEDIUM, AND ELECTRONIC DEVICE

CROSS REFERENCE

The present disclosure is a U.S. National Stage of International Application No. PCT/CN2021/136174, filed on Dec. 7, 2021, and claims priority to Chinese Patent Application No. 202110354599.9 entitled "Method for processing warehouse order task, apparatus, storage medium, and electronic device", filed on Mar. 30, 2021, both the entire contents of which are incorporated herein by reference.

TECHNICAL FIELD

The present disclosure relates to the field of logistics technology, and in particular, to a method for processing a warehouse order task, an apparatus, a storage medium, and an electronic device.

BACKGROUND

In existing warehouse order production, it mainly depends on manual operation. According to a production end time sequence that needs to be satisfied for fulfilling the orders, and in combination with other constraint conditions such as order quantity, order volume, etc., the orders satisfying the requirements are sequentially issued to production personnel for production by grouping them into task orders, so as to ensure the outbound timeliness of the orders.

SUMMARY

According to a first aspect of the embodiments of the present disclosure, there is provided a method for processing a warehouse order task, including: determining a production end time of an order to be processed; determining a production period of a batch task that the order to be processed belongs to; determining whether to issue the order to be processed to a picking pool according to the production end time and the production period; in response to determining not to issue the order to be processed to the picking pool, assigning the order to be processed to a picking terminal according to a backlog quantity of orders to be outbound and an outbound productivity; and, in response to determining to issue the order to be processed to the picking pool, assigning the order to be processed to a picking terminal according to an order quantity of the batch task and a batch completion efficiency.

In some embodiments of the present disclosure, the method for processing a warehouse order task further includes: obtaining attribute information of an order fed back by a client, the attribute information including at least one of a manner of production, a production requirement, and a storage location encoding of an article in the order in a warehouse; and, generating the order to be processed according to the attribute information.

In some embodiments of the present disclosure, determining whether to issue the order to be processed to a picking pool according to the production end time and the production period includes: determining whether the production end time belongs to the production period; in response to determining that the production end time belongs to the production period, determining to issue the order to be processed to the picking pool; and, in response to determining that the production end time does not belong to the production period, determining not to issue the order to be processed to the picking pool.

In some embodiments of the present disclosure, the method for processing a warehouse order task further includes: determining an order to be processed that is placed in a storage location and assigned to the picking pool as a first type order; determining an order to be processed that is placed in a storage location and not assigned to the picking pool as a second type order; and, determining that a picking priority of the first type order is higher than a picking priority of the second type order.

In some embodiments of the present disclosure, in response to determining not to issue the order to be processed to the picking pool, assigning the order to be processed to a picking terminal according to a backlog quantity of orders to be outbound and an outbound productivity includes: determining a maximum quantity of reviewed orders; determining an assignable quantity according to the backlog quantity of orders to be outbound and the maximum quantity of the reviewed orders; and, assigning the order to be processed to the picking terminal according to the assignable quantity and the outbound productivity.

In some embodiments of the present disclosure, the method for processing a warehouse order task further includes: determining location information of a storage location where the picking terminal is located; predicting a picking path of the picking terminal according to the location information; and, assigning the order to be processed of the picking path to the picking terminal.

In some embodiments of the present disclosure, assigning the order to be processed to the picking terminal according to the assignable quantity and the outbound productivity includes: determining a first quantity of the order to be processed of the storage location; determining whether the first quantity is less than or equal to the assignable quantity; in response to determining that the first quantity is less than or equal to the assignable quantity, assigning the order to be processed of the storage location to the picking terminal; in response to determining that the first quantity is greater than the assignable quantity, assigning the order to be processed to the picking terminal according to the production end time; in response to determining that the first quantity is greater than the assignable quantity, and production end times of a plurality of orders to be processed are the same, assigning the order to be processed to the picking terminal according to an article quantity in the order to be processed; and, in response to determining that the first quantity is greater than the assignable amount, production end times of a plurality of orders to be processed are the same, and article quantities in a plurality of orders to be processed are the same, assigning the order to be processed to the picking terminal according to an order receiving time of the order to be processed.

In some embodiments of the present disclosure, in response to determining to issue the order to be processed to the picking pool, assigning the order to be processed to a picking terminal according to an order quantity of the batch task and the batch completion efficiency includes: determining a backlog quantity of the batch task; determining a duration of the batch task according to the production period; determining the batch completion efficiency according to a historical record of the batch task; determining a quantity of batch picking terminals required for performing the batch task according to the backlog quantity, the duration and the batch completion efficiency of the batch task; determining a quantity of all picking terminals in an idle state; determining a proportion between the quantity of the batch picking terminals and the quantity of all picking terminals; selecting a picking terminal in an idle state at intervals in a storage location channel as a batch picking terminal according to the proportion; and, assigning the order to be processed to the batch picking terminal.

In some embodiments of the present disclosure, assigning the order to be processed to a picking terminal includes: determining picking attribute information of the order to be processed, where the picking attribute information including at least one of a storage location to be picked, an article name and an article quantity; and, sending the picking attribute information to the picking terminal.

In some embodiments of the present disclosure, the method for processing a warehouse order task further includes: in response to determining that the production end time does not belong to the production period, determining an assignable quantity of orders according to an order backlog quantity in the production process.

According to a second aspect of the present disclosure, there is provided an electronic device, including: a memory; and a processor coupled to the memory; where the processor is configured to execute the method according to any one of the above based on an instruction stored in the memory.

According to a third aspect of the present disclosure, there is provided a computer-readable storage medium with a program stored on it; when the program is executed by a processor, the method for processing a warehouse order task according to any one of the above is implemented.

It should be understood that the above general description and the following detailed description are merely exemplary and explanatory, and cannot limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skill in the art, other drawings can also be obtained from these drawings without creative efforts.

DETAILED DESCRIPTION

Figure 1:
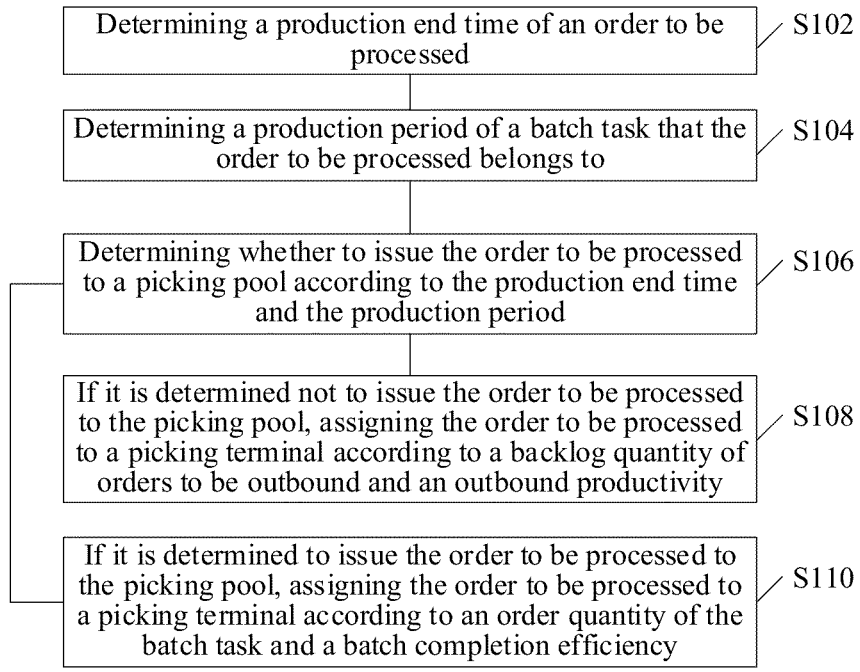
FIG. 1 shows a flowchart of a method for processing a warehouse order task according to some embodiments of the present disclosure.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The described features, structures, or characteristics may be combined into one or more embodiments in any suitable manner. In the following description, numerous specific details are provided to give a thorough understanding of embodiments of the present disclosure. However, those skilled in the art will realize that the technical solution of the present disclosure can be practiced while omitting one or more specific details, or employing other methods, components, devices, steps, etc. In other cases, commonly known technical solutions are not shown or described in detail, so as to avoid blurring various aspects of the present disclosure due to a reversal of the order of host and guest.

In addition, the drawings are merely schematic diagrams of the present disclosure, and the same reference numerals in the drawings represent the same or similar parts, and thus the repeated description of them will be omitted. Some block diagrams shown in the drawings are functional entities, and do not necessarily correspond to physical or logically independent entities. These functional entities may be implemented in the form of software, or these functional entities may be implemented in one or more hardware modules or integrated circuits, or these functional entities may be implemented in different networks and/or processor devices and/or microcontroller devices.

In related art, the existing warehouse order production method mainly has the following disadvantages.

1) There is a need to set related posts to manually group task orders, and the operation is tedious and time consuming, which results in low processing efficiency of the warehouse order task and large stock backlog quantity.

2) After the task order is grouped, there is a binding relationship for the order in the task order, and the picking task is no longer to be adjusted according to a new order that is issued in real time, which affects the outbound speed of the new order with a high requirement for timeliness.

3) When the outbound backlog quantity is large, there is no objective method to determine assignment of various orders for picking, which not only easily results in order timeout, but also seriously affects the customer's experience.

It should be noted that the information disclosed in the above background part is only used to enhance the understanding of the background of the present disclosure, and therefore may include information that does not constitute related art known to those of ordinary skill in the art.

An objective of the present disclosure is to provide a method for processing a warehouse order task, an apparatus, and an electronic device, which are used to at least overcome the problem of low outbound efficiency caused by limitations and disadvantages of related technologies to a certain extent.

Example embodiments of the present disclosure will be described in detail below with reference to FIGS. 1 to 14.

FIG. 1 shows a flowchart of a method for processing a warehouse order task according to some embodiments of the present disclosure.

As shown in FIG. 1, the method for processing a warehouse order task may include following steps.

In step S102, a production end time of an order to be processed is determined.

In step S104, a production period of a batch task that the order to be processed belongs to is determined.

Step S106, whether to issue the order to be processed to a picking pool is determined according to the production end time and the production period.

In step S108, if it is determined not to issue the order to be processed to the picking pool, the order to be processed is assigned to a picking terminal according to a backlog quantity of orders to be outbound and an outbound productivity.

In step S110, if it is determined to issue the order to be processed to the picking pool, the order to be processed is assigned to a picking terminal according to an order quantity of the batch task and batch completion efficiency.

In the embodiments of the present disclosure, it is determined whether to issue the order to be processed to the picking pool according to the production end time and the production period, so as to determine the manner of assigning the order to be processed to a picking terminal; there is no need for human participation in production rhythm adjustment, which is beneficial to improving the outbound efficiency of the warehouse order. In addition, the binding relationship between the task assignment and the picking link is decoupled; the task priority can be adjusted in the task assignment and picking link according to the real-time order condition, which improves the production timeliness of the order to be processed.

In some embodiments of the present disclosure, the production period is determined by the end time of the batch task and the duration of the batch task (or recorded as a protection duration). The production end time of the configured batch task is 12:30, the protection duration of the batch task is 30 minutes, and the corresponding service meaning is: in the period of 12: 00-12:30, determining orders that the priority outbound production end time is earlier than 12:30.

Figure 2:
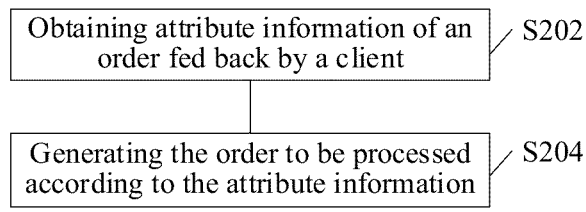
FIG. 2 shows a flowchart of a method for processing a warehouse order task according to some embodiments of the present disclosure.

As shown in FIG. 2, the method for processing a warehouse order task in some embodiments of the present disclosure further includes following steps.

In step S202, attribute information of an order fed back by a client is obtained, where the attribute information includes at least one of a manner of production, a production requirement, and a storage location encoding of an article in the order in a warehouse.

In step S204, the order to be processed is generated according to the attribute information.

In some embodiments of the present disclosure, attribute information of an order fed back by a client is obtained, the order to be processed is generated according to the attribute information, and the outbound timeliness requirement and the placement location of the article in the order are determined by the attribute information of the order to be processed. Based on this, the warehouse system issues the order to be processed to the picking pool according to the attribute information included in the order to be processed generated in real time, so as to improve the order outbound efficiency through centralized processing of the picking pool. Alternatively, the warehouse system issues the order to be processed to the picking terminal of the common process, and positions the articles in the order to be processed in the warehouse.

Figure 3:
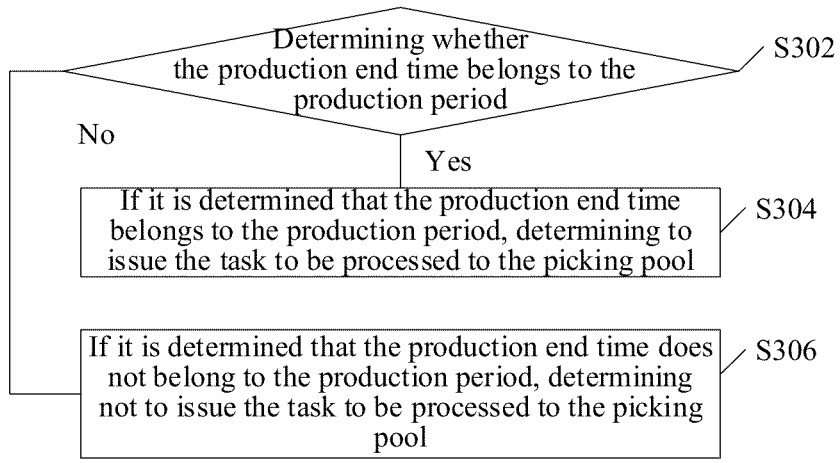
FIG. 3 shows a flowchart of a method for processing a warehouse order task according to some embodiments of the present disclosure.

As shown in FIG. 3, determining whether to issue the order to be processed to a picking pool according to the production end time and the production period includes following steps.

In step S302, it is determined whether the production end time belongs to the production period; if yes, step S304 is executed; and if not, step S306 is executed.

In step S304, if it is determined that the production end time belongs to the production period, it is determined to issue the order to be processed to the picking pool.

In step S306, if it is determined that the production end time does not belong to the production period, it is determined not to issue the order to be processed to the picking pool.

In some embodiments of the present disclosure, it is determined whether the production end time belongs to the production period; if it is determined that the production end time belongs to the production period, it is determined to issue the order to be processed to the picking pool, so as to perform centralized flow picking through the picking pool, which is beneficial to improving the outbound efficiency of the order with high timeliness.

According to an embodiment of the present disclosure, if it is determined that the production end time does not belong to the production period, that is, within a non-batch production time, the following assignment steps are performed.

Before each assignment, the assignable quantity of orders this time is calculated according to the order backlog quantity in the production process.

The calculation method is as follows: the assignable quantity is equal to the upper limit of the reviewed orders minus the order backlog quantity; where, the upper limit of the reviewed orders is equal to the total quantity of the grids of all review stations plus a certain buffer value, and the order backlog quantity is the total quantity of orders in the production process from the start of task assignment and issue to incomplete of packaging.

The purpose of this step is to avoid the backlog of the order in the subsequent review link and control the overall production rhythm.

For each task assignment, the order on a storage location is selected for issuance, and the rule for selecting the storage location is: according to the picking storage location where the picker is located, selecting a next storage location with positioning detail according to the storage location encoding sequence, so that the picker can obtain the maximum picking density in flow picking, and pick up more articles in one walk.

According to an embodiment of the present disclosure, if it is determined that the production end time belongs to the production period, that is, within the batch production time, the following assignment steps are performed.

Before each assignment, the manner of calculating the assignable quantity is the same as above.

Before each assignment, it is firstly determined whether there is an order that satisfies the batch production end time (i.e., an order that needs to be issued in priority) in the task assignment order pool. If not, the process according to the non-batch production time is performed; and if so, when selecting a storage location, a storage location with order positioning detail that satisfies the batch production end time needs to be selected. If there is no order that satisfies the requirement in the storage location, it is continued to determine a next storage location according to the storage location encoding sequence, until a storage location is selected.

After the storage location is selected, the actually assigned order is selected according to the assignable quantity. If a same storage location includes both the order satisfying the batch production end time and the order not satisfying the batch production end time, only the satisfied part can be assigned, so as to ensure that this part of order can be picked in priority.

Figure 4:
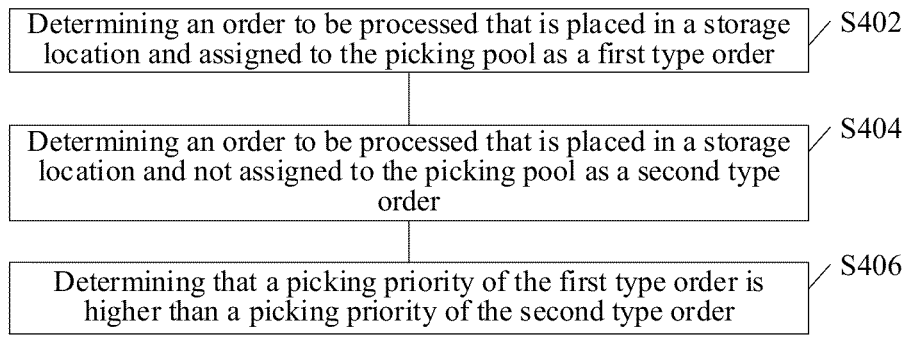
FIG. 4 shows a flowchart of a method for processing a warehouse order task according to some embodiments of the present disclosure.

As shown in FIG. 4, the method for processing a warehouse order task in some embodiments of the present disclosure further includes following steps.

In step S402, an order to be processed that is placed in a storage location and assigned to the picking pool is determined as a first type order.

In step S404, an order to be processed that is placed in a storage location and not assigned to the picking pool is determined as a second type order.

In step S406, it is determined that a picking priority of the first type order is higher than a picking priority of the second type order.

In some embodiments of the present disclosure, under the condition that the outbound pressure is large, by determining that the picking priority of the first type order is higher than the picking priority of the second type order, the relationship between the outbound failure requirement and the outbound efficiency is balanced. Under the condition that the manual picking efficiency reaches the upper limit, the article with the higher priority is picked in priority.

Figure 5:
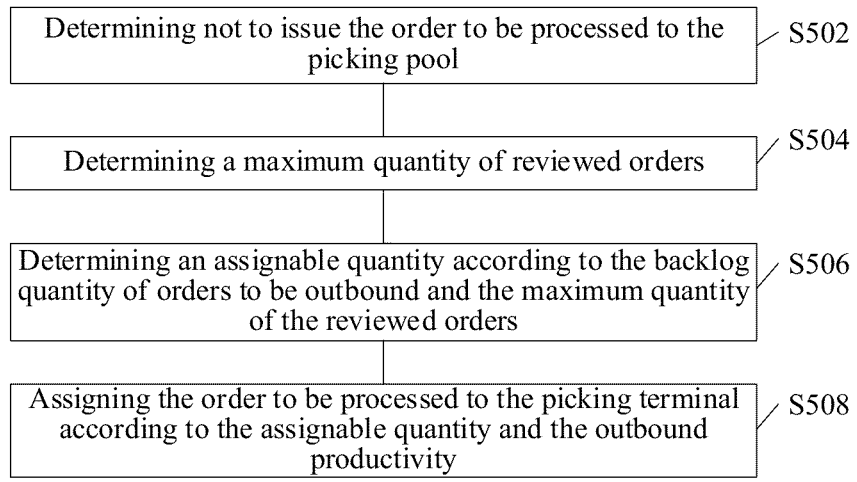
FIG. 5 shows a flowchart of a method for processing a warehouse order task according to some embodiments of the present disclosure.

As shown in FIG. 5, if it is determined not to issue the order to be processed to the picking pool, assigning the order to be processed to a picking terminal according to a backlog quantity of orders to be outbound and an outbound productivity includes following step.

In step S502, it is determined not to issue the order to be processed to the picking pool.

In step S504, a maximum quantity of reviewed orders is determined.

In step S506, an assignable quantity is determined according to the backlog quantity of orders to be outbound and the maximum quantity of reviewed orders.

In step S508, the order to be processed is assigned to the picking terminal according to the assignable quantity and the outbound productivity.

In some embodiments of the present disclosure, the assignable quantity is determined according to the backlog quantity of orders to be outbound and the maximum quantity of reviewed orders, and the order to be processed is assigned to the picking terminal according to the assignable quantity and the outbound productivity, which not only improves the outbound efficiency and timeliness, but also is beneficial to reducing the backlog quantity of the warehouse system.

Figure 6:
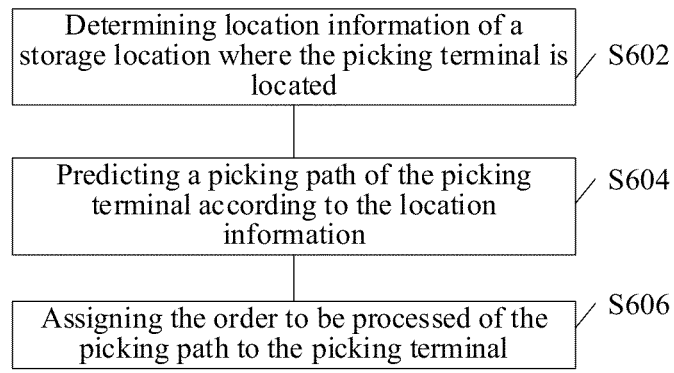
FIG. 6 shows a flowchart of a method for processing a warehouse order task according to some embodiments of the present disclosure.

As shown in FIG. 6, the method for processing a warehouse order task in some embodiments of the present disclosure further includes following steps.

In step S602, location information of a storage location where the picking terminal is located is determined.

In step S604, a picking path of the picking terminal is predicted according to the location information.

In step S606, the order to be processed of the picking path is assigned to the picking terminal.

In some embodiments of the present disclosure, the location information of the storage location where the picking terminal is located is determined, and the picking path of the picking terminal is predicted according to the location information, furthermore, the order to be processed of the picking path is assigned to the picking terminal, by which the picking path is shortened, the picking density is increased, and the picking efficiency of the picking terminal is improved.

A step of issuing a picking task of batch production according to an embodiment of the present disclosure includes following steps.

(1) A channel is calculated. It is determined whether there is a picking task of an order satisfying the batch production time in a previous picking storage location or a backward storage location in the channel where the previous picking storage location of the picker is located; if yes, the storage location is selected; and if not, a channel having a picking task of an order satisfying the batch production time is selected by taking a channel next to the channel where the previous picking storage location is located as the first one and sorting from small to large according to channel encoding.

(2) A storage location is calculated. If the selected channel is the channel where the previous picking storage location is located, the storage location that ranks first is selected from the previous picking storage location or the backward storage location according to the storage location picking sequence; and if the selected channel is not the channel where the previous picking storage location is located, the storage location that ranks first is selected according to the storage location picking sequence of the channel.

(3) A unique article to be picked is calculated. According to all article positioning details of the selected storage location, a detail part corresponding to the order satisfying the batch production time in the orders is selected, and then it is determined to issued a task in combination with the determination rule (for example, the same picking container cannot be mixed with article batches) of other normal picking processes.

When issuing a task each time, calculation in the steps (1) to (3) needs to be performed. After all batch production orders in the task pool have been picked, the picker returns to the general flow picking mode automatically. After picking is completed, the order outbound is to be completed according to a subsequent process of distributing, reviewing and packing in existing warehouse production.

Figure 7:
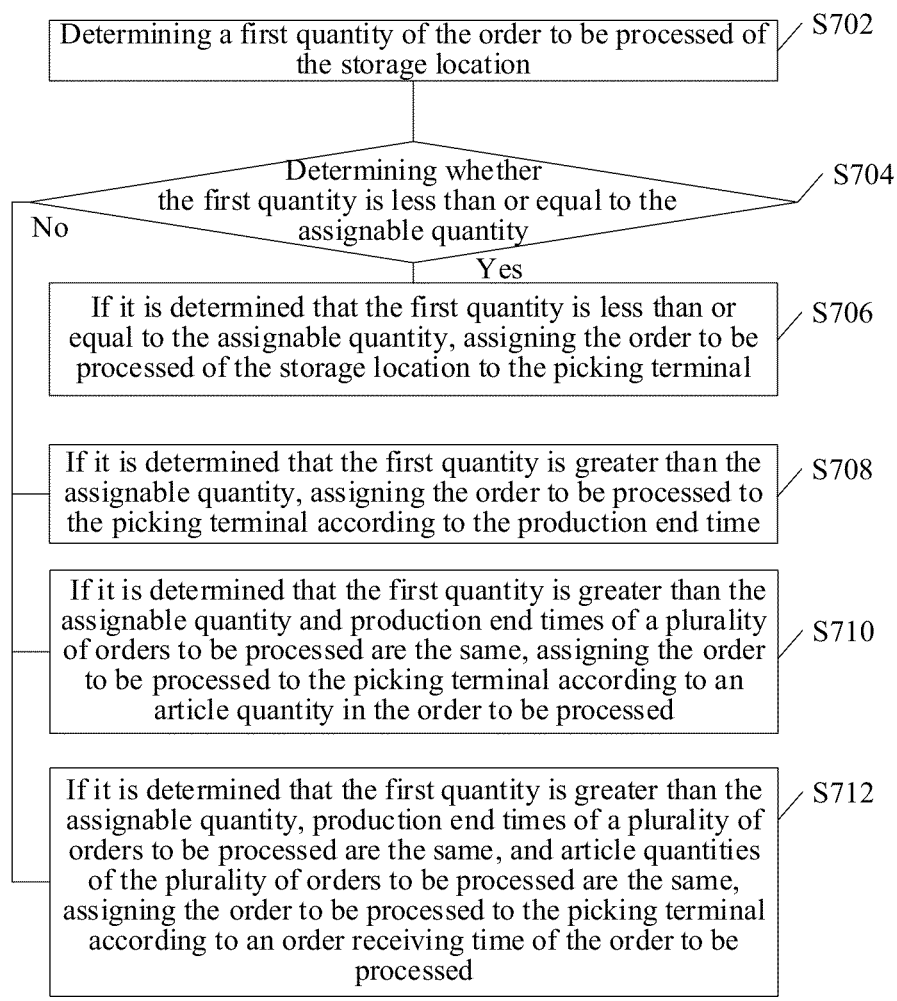
FIG. 7 shows a flowchart of a method for processing a warehouse order task according to some embodiments of the present disclosure.

As shown in FIG. 7, assigning the order to be processed to the picking terminal according to the assignable quantity and the outbound productivity includes following steps.

In step S702, a first quantity of the order to be processed of the storage location is determined.

In step S704, whether the first quantity is less than or equal to the assignable quantity is determined.

In step S706, if it is determined that the first quantity is less than or equal to the assignable quantity, the order to be processed of the storage location is assigned to the picking terminal.

In step S708, if it is determined that the first quantity is greater than the assignable quantity, the order to be processed is assigned to the picking terminal according to the production end time.

In step S710, if it is determined that the first quantity is greater than the assignable quantity and production end times of a plurality of orders to be processed are the same, the order to be processed is assigned to the picking terminal according to an article quantity in the order to be processed.

In step S712, if it is determined that the first quantity is greater than the assignable quantity, production end times of a plurality of orders to be processed are the same, and article quantities of the plurality of orders to be processed are the same, the order to be processed is assigned to the picking terminal according to an order receiving time of the order to be processed.

In some embodiments of the present disclosure, after selecting a storage location, the assignable quantity is calculated, and the order detail assigned to the storage location is determined. The outbound priority rule according to the embodiments of the present disclosure includes following.

(1) When the order quantity corresponding to the positioning detail in the selected storage location is larger than an assignable quantity of orders, it is ranked according to the production end times of the orders from early to late.

(2) When the production end times are the same, it is ranked according to the order article quantities from large to small.

(3) When the article quantities are the same, it is ranked according to the order receiving time from early to late.

(4) When the order quantity corresponding to the positioning detail on the selected storage location is less than an assignable quantity of orders, the orders in the whole storage location are all assigned.

(5) After selecting the actually assigned orders, the positioning detail of these orders in other storage locations are assigned simultaneously.

Figure 8:
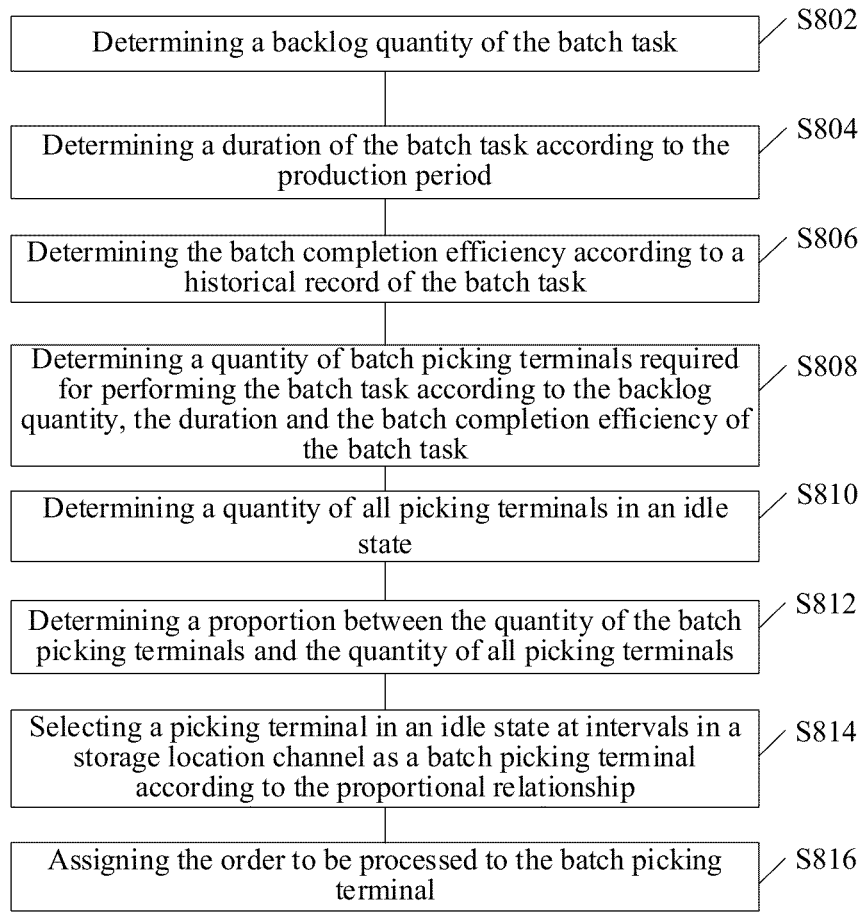
FIG. 8 shows a flowchart of a method for processing a warehouse order task according to some embodiments of the present disclosure.

As shown in FIG. 8, if it is determined to issue the order to be processed to the picking pool, assigning the order to be processed to a picking terminal according to an order quantity of the batch task and the batch completion efficiency includes following steps.

In step S802, a backlog quantity of the batch task is determined.

In step S804, a duration of the batch task is determined according to the production period.

Step S806, the batch completion efficiency is determined according to a historical record of the batch task.

In step S808, a quantity of batch picking terminals required for performing the batch task is determined according to the backlog quantity, the duration and the batch completion efficiency of the batch task.

In step S810, a quantity of all picking terminals in an idle state is determined.

In step S812, a proportion between the quantity of the batch picking terminals and the quantity of all picking terminals is determined.

Step S814, a picking terminal in an idle state is selected at the storage channel interval as a batch picking terminal according to the proportion relationship.

In step S816, the order to be processed is assigned to the batch picking terminal.

In some embodiments of the present disclosure, the picker automatically gets the picking task detail of the corresponding storage location according to the storage location where the picker is located. Specifically, the warehouse management system (server side) performs background task calculation and issues it to the handheld picking device corresponding to the picker.

Among them, the picker not only may be understood as a natural person, but also may be understood as an automatic picking robot.

At the front end page of the handheld picking device, the storage location to be picked, the article to be picked, the quantity and the like are displayed; the picker walks to the corresponding storage location, scans the article bar code, inputs the picking quantity after system verification, and completes one-time picking and off-shelf operation after confirmation.

In some embodiments of the present disclosure, in the non-batch production time, with no picking state differentiation, the picker gets tasks all according to the walking path, and all tasks can be got.

In some embodiments of the present disclosure, in the batch production time, with picking state differentiation, the picker partially performs picking still according to the original manner, and partially can only get the order task satisfying the batch production end time. The specific assignment step includes following.

(1) It is determined whether it is in the batch production time; if not, picking is performed according to the original process.

(2) It is determined whether there is an order satisfying the batch production end time in the picking task pool; if not, picking is performed according to the original process.

(3) The picking state of the picker is determined; if the picking state is general picking, picking is performed according to the original process; and, if the picking state is batch picking, picking is performed according to the following process.

(4) The method for determining the picking state of the picker is as follows. The picking state includes two types of general picking and batch picking. Since the orders of the batch production may be assigned to different storage locations, in order to balance the picking efficiency and the order production timeliness, all pickers will not be used as batch production personnel. However, when the production time of each batch starts, the required personnel quantity and the personnel list are automatically calculated according to the rule. In each picking logic area, the method for independently calculating the personnel quantity of the batch production is as shown in formula I and formula II.

The personnel quantity=the proportion coefficient×the batch backlog total quantity in the logical area/(the average quantity of pickers in the previous hour×batch completion duration) (formula I).

The average quantity of pickers in the previous hour=the total quantity of articles picked in the previous hour/the total quantity of personnel picking in the previous hour (formula II).

In some embodiments of the present disclosure, the batch backlog total quantity in the logical area includes the article quantities of all batches that need to be picked in priority at present.

In some embodiments of the present disclosure, the time range for calculating the average personnel efficiency in the previous hour is one hour before the start of the batch protection time.

In some embodiments of the present disclosure, a reference value range (e.g. 200-500, unit: piece/hour) is set for the average personnel efficiency in the previous hour. When the total quantity of articles picked in the previous hour in the denominator of the formula II is equal to 0, or the calculated the average personnel efficiency of the picker in the previous hour is not within the reference value range, a fixed personnel effect reference value (e.g., 350, unit: piece/hour) is taken as the average personnel efficiency of the picker in the previous hour.

In some embodiments of the present disclosure, when the batch completion duration in the denominator of the formula I is equal to 0, the personnel quantity is directly set equal to 0. The unit of the batch completion duration (i.e., the configured batch production duration) is the hour.

In some embodiments of the present disclosure, the proportion coefficient is an adjustable parameter that can be configured by the storehouse management system, the default value of which is 1. The function of the parameter is to adjust the personnel quantity automatically calculated by the system, so as to better adapt the production requirements of the warehouse on site.

After calculating the personnel quantity, according to the logic area attribute corresponding to the picker, the system obtains the picker list corresponding to each picking logic area, and the storage location and the channel location where they are located in real time. In order to ensure more rapid completion of the batch production task, according to the proportion of the batch production personnel quantity to the total quantity of picking personnel, the picker list for the batch production is selected according to the channel sequence at equal intervals.

Figure 9:
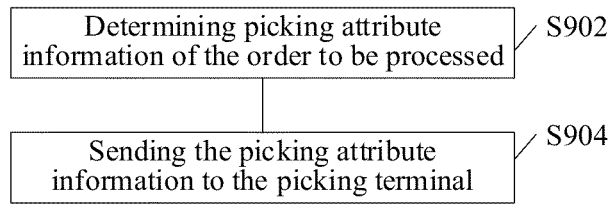
FIG. 9 shows a flowchart of a method for processing a warehouse order task according to some embodiments of the present disclosure.

As shown in FIG. 9, assigning the order to be processed to the picking terminal includes following steps.

In step S902, picking attribute information of an order to be processed is determined, where the picking attribute information includes at least one of a storage location to be picked, an article name, and an article quantity.

In step S904, the picking attribute information is sent to the picking terminal.

Figure 10:
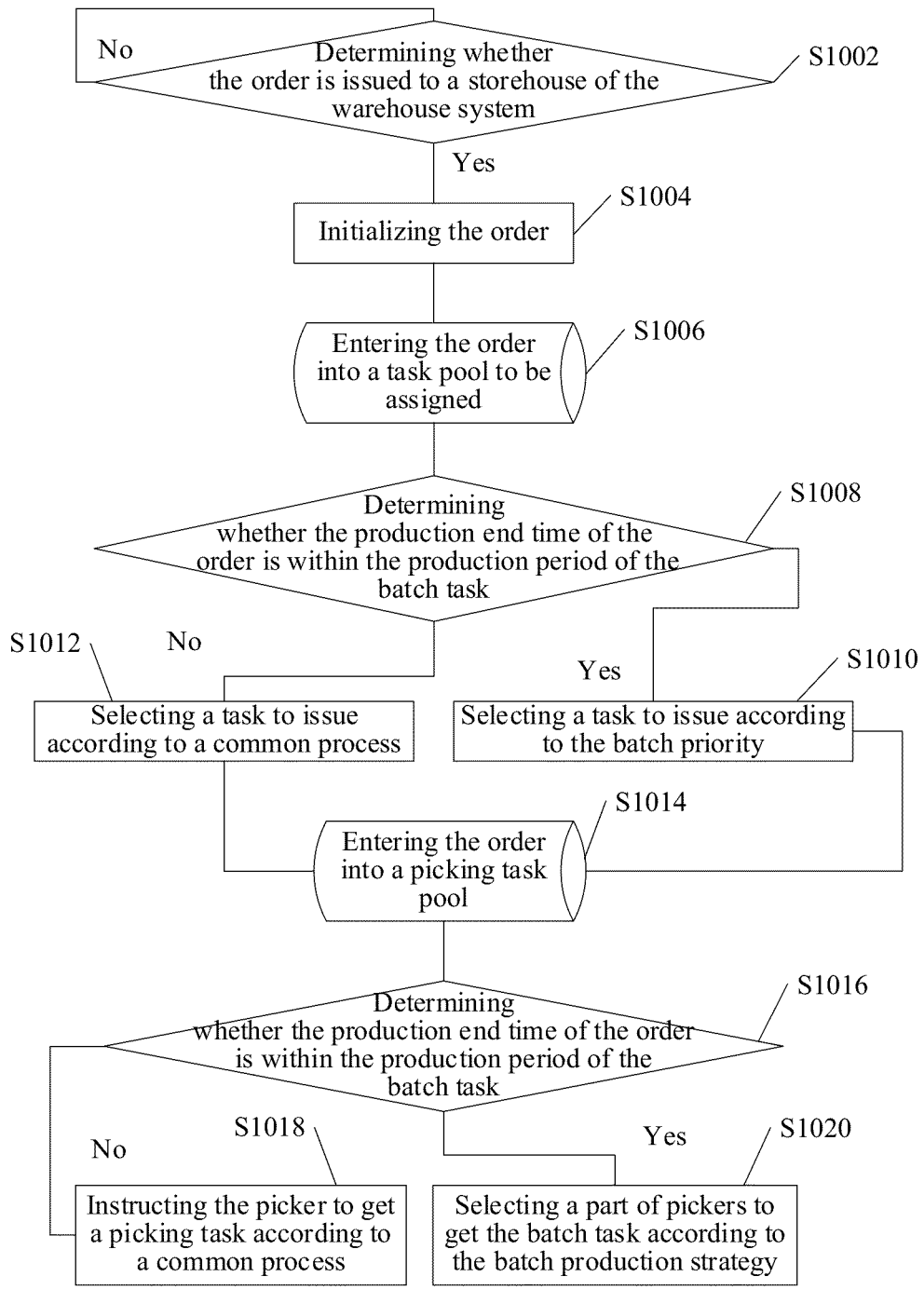
FIG. 10 shows a flowchart of a method for processing a warehouse order task according to some embodiments of the present disclosure.

As shown in FIG. 10, the method for processing a warehouse order task in some embodiments of the present disclosure further includes following steps.

In step S1002, it is determined whether the order is issued to a storehouse of the warehouse system; if yes, step S1004 is executed; and, if not, it returns to execute step S1002.

In step S1004, the order is initialized.

In step S1006, the order is entered into a task pool to be assigned.

In step S1008, it is determined whether the production end time of the order is within the production period of the batch task; if yes, step S1010 is executed; and, if not, step S1012 is executed.

In step S1010, a task is selected to issue according to the batch priority.

In step S1012, a task is selected to issue according to a common process.

In step S1014, the order is entered into a picking task pool.

In step S1016, it is determined whether the production end time of the order is within the production period of the batch task; if yes, step S1020 is executed; and, if not, step S1018 is executed.

In step S1018, the picker is instructed to get a picking task according to a common process.

In step S1020, a part of pickers is selected to get the batch task according to the batch production strategy.

Figure 14:
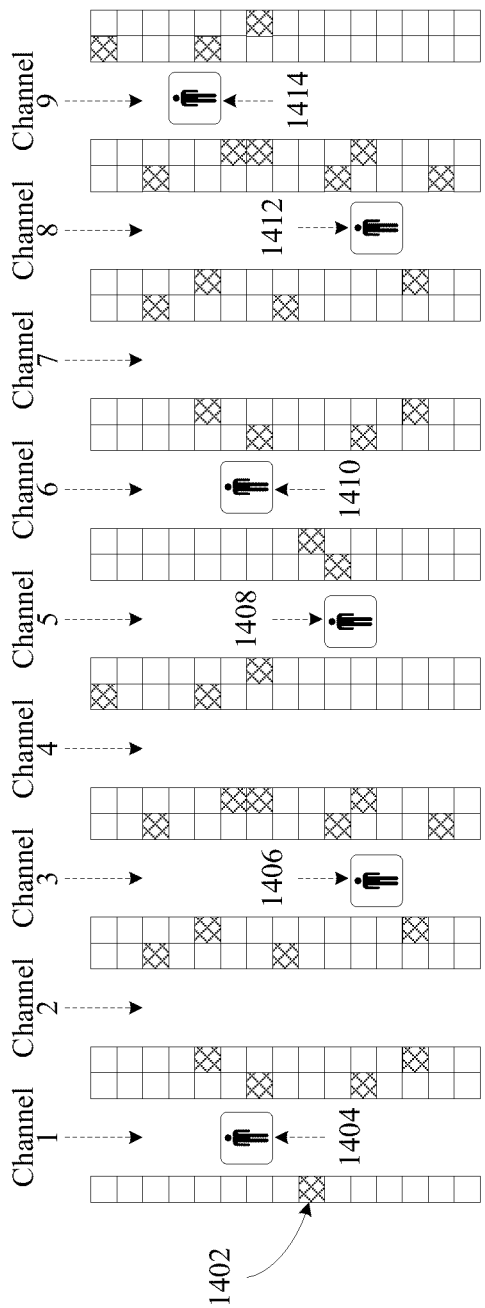
FIG. 14 is a schematic diagram of a warehouse system according to some embodiments of the present disclosure.

As shown in FIG. 14, a warehouse includes nine channels and ten rows of shelves. The nine channels are respectively marked as channel 1, channel 2, channel 3, channel 4, channel 5, channel 6, channel 7, channel 8 and channel 9, and the picker of the channel is a first picker 1404, a second picker 1406, a third picker 1408, a fourth picker 1410, a fifth picker 1412 and a sixth picker 1414, respectively.

According to the technical solution of the embodiments of the present disclosure, it is determined that the article 1402 of the order to be processed entering the picking pool is distributed on the ten rows of shelves; and, according to the proportionality coefficient, it is determined that the final selected batch production picker is the first picker 1404 in the channel 1 and the fourth picker 1410 in the channel 6.

For the defects in the existing warehouse order production process that the issue and execution of the picking task requires manual participation, which is not flexible enough and cannot cope with the actual production scene, a method and a system for order batch production based on flow picking are designed in the present disclosure. According to the method, the system automatically performs automatic task issuance according to the configured batch production time and the production end time of the order, and takes the order backlog condition of subsequent production link into consideration during task issuance, avoiding production blockage caused by excessive issuance. In addition, the batch order backlog quantity and the personnel productivity condition are taken as a reference in the picking link, and a certain quantity of batch production pickers is selected. According to the technical solution of the present disclosure, not only the order issuance in different scenes can be flexibly dealt with, but also the reasonable productivity arrangement can be ensured, balancing the picking efficiency with the order batch requirement, and improving the intelligence and automation level of warehouse operations.

Corresponding to the foregoing method embodiments, the present disclosure further provides an apparatus for processing a warehouse order task, which may be used to perform the foregoing method embodiments.

Figure 11:
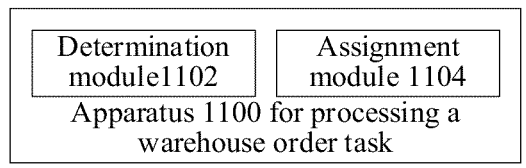
FIG. 11 is a block diagram of an apparatus for processing a warehouse order task according to some embodiments of the present disclosure.

FIG. 11 is a block diagram of an apparatus for processing a warehouse order task according to some embodiments of the present disclosure.

Referring to FIG. 11, the apparatus 1100 for processing a warehouse order task may include a determination module 1102 and an assignment module 1104.

The determination module 1102 is configured to determine a production end time of an order to be processed.

The determination module 1102 is further configured to determine a production period of a batch task that the order to be processed belongs to.

The determination module 1102 is further configured to determine whether to issue the order to be processed to a picking pool according to the production end time and the production period.

The assignment module 1104 is configured to, if it is determined not to issue the order to be processed to the picking pool, assign the order to be processed to a picking terminal according to a backlog quantity of orders to be outbound and an outbound productivity.

The assignment module 1104 is further configured to, if it is determined to issue the order to be processed to the picking pool, assign the order to be processed to the picking terminal according to an order quantity and a batch completion efficiency.

In some embodiments of the present disclosure, the determination module 1102 is further configured to: obtain attribute information of an order fed back by a client, the attribute information including at least one of a manner of production, a production requirement, and a storage location encoding of an article in the order in a warehouse; and, generate the order to be processed according to the attribute information.

In some embodiments of the present disclosure, the determination module 1102 is further configured to: determine whether the production end time belongs to the production period; if it is determined that the production end time belongs to the production period, determine to issue the order to be processed to the picking pool; and, if it is determined that the production end time does not belong to the production period, determine not to issue the order to be processed to the picking pool.

In some embodiments of the present disclosure, the determination module 1102 is further configured to: determine an order to be processed that is placed in a storage location and assigned to the picking pool as a first type order; determine an order to be processed that is placed in a storage location and not assigned to the picking pool as a second type order; and, determine that a picking priority of the first type order is higher than a picking priority of the second type order.

In some embodiments of the present disclosure, the assignment module 1104 is further configured to: determine not to issue the order to be processed to the picking pool; determining a maximum quantity of reviewed orders; determine an assignable quantity according to the backlog quantity of orders to be outbound and the maximum quantity of the reviewed orders; and, assign the order to be processed to the picking terminal according to the assignable quantity and the outbound productivity.

In some embodiments of the present disclosure, the assignment module 1104 is further configured to: determine location information of a storage location where the picking terminal is located; predict a picking path of the picking terminal according to the location information; and, assign the order to be processed of the picking path to the picking terminal.

In some embodiments of the present disclosure, the assignment module 1104 is further configured to: determine a first quantity of the order to be processed of the storage location; determine whether the first quantity is less than or equal to the assignable quantity; if it is determined that the first quantity is less than or equal to the assignable quantity, assign the order to be processed of the storage location to the picking terminal; if it is determined that the first quantity is greater than the assignable quantity, assign the order to be processed to the picking terminal according to the production end time; if it is determined that the first quantity is greater than the assignable quantity, and production end times of a plurality of orders to be processed are the same, assign the order to be processed to the picking terminal according to an article quantity in the order to be processed; and, if it is determined that the first quantity is greater than the assignable amount, production end times of a plurality of orders to be processed are the same, and article quantities in a plurality of orders to be processed are the same, assign the order to be processed to the picking terminal according to an order receiving time of the order to be processed Since the functions of the apparatus 1100 have been described in detail in the corresponding method embodiments, details are not described here again.

It should be noted that although several modules or units of a device for performing actions are mentioned in the above detailed description, such partitioning is not mandatory. Indeed, according to embodiments of the present disclosure, the features and functions of two or more modules or units described above may be embodied in one module or unit. Conversely, the features and functions of one module or unit described above may be further divided to be concretized by a plurality of modules or units.

In some embodiments of the present disclosure, there is further provided an electronic device capable of implementing the above method.

Those skilled in the art can understand that various aspects of the present disclosure may be implemented as a system, a method, or a program product. Therefore, various aspects of the present disclosure may be specifically implemented in the following form: a complete hardware implementation, a complete software implementation (including firmware, microcode, etc.), or an implementation combining hardware and software, which may be collectively referred to as a "circuit", "a module" or "a system" here.

Figure 12:
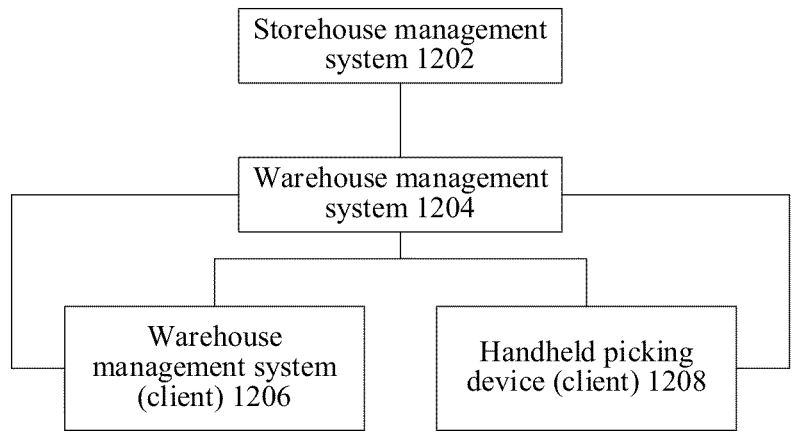
FIG. 12 is a block diagram of another apparatus for processing a warehouse order task according to some embodiments of the present disclosure.

As shown in FIG. 12, the structure of an order batch production system based on flow picking according to an embodiment of the present disclosure includes: a storehouse management system 1202, a warehouse management system (server) 1204, a warehouse management system (client) 1206, and a handheld picking device (client) 1208.

Among them, basic information related to production is stored in the storehouse management system 1202. The warehouse management system 1204 actually manages the production process and obtains the basic information from the storehouse management system 1202. After obtaining all related information including order information and storehouse configuration information, the warehouse management system (server) 1204 performs background logic calculation and interaction, and displays related results on a front-end interface of the warehouse management system (client) 1206 and a front-end interface of the handheld picking device (client) 1208.

Furthermore, the operator may perform operation and confirmation on the front-end interface of the handheld picking device (client) 1208, and return the corresponding data to the warehouse management system (server) 1204 for storing in the background database.

The electronic device 1300 according to the embodiment of the present disclosure will be described below with reference to FIG. 13. The electronic device 1300 shown in FIG. 13 is only an example and should not impose any limitations on the function and usage scope of the embodiments of the present disclosure.

Figure 13:
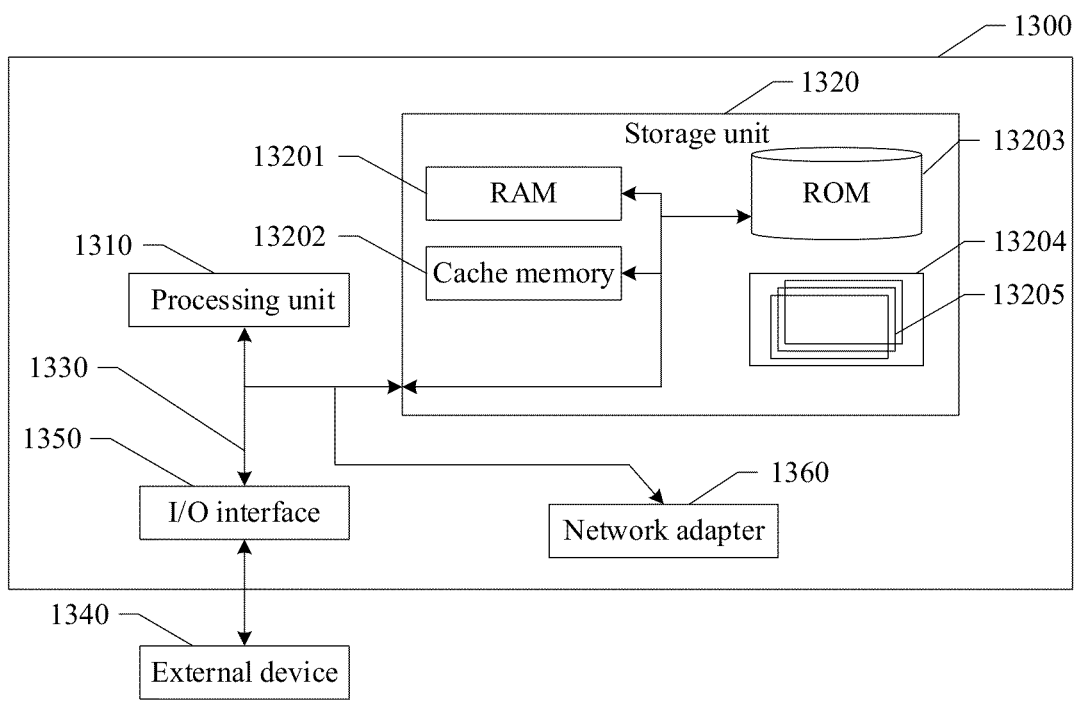
FIG. 13 is a block diagram of an electronic device according to some embodiments of the present disclosure.

As shown in FIG. 13, the electronic device 1300 is represented in the form of a general-purpose computing device. The components of the electronic device 1300 may include, but are not limited to: at least one processing unit 1310, at least one storage unit 1320, and the bus 1330 connecting different system components (including the storage unit 1320 and the processing unit 1310).

Among them, the storage unit stores program code, and the program code may be executed by the processing unit 1310 to enable the processing unit 1310 to perform the steps according to various exemplary embodiments of the present disclosure described in the above "exemplary method" part of the present description. For example, the processing unit 1310 may perform the method as shown in the embodiments of the present disclosure.

The storage unit 1320 may include a readable medium in the form of a volatile memory unit, such as a random access memory unit (RAM) 13201 and/or a cache memory storage unit 13202, and may further include a read-only memory unit (ROM) 13203.

The storage unit 1320 may further include a program/utility 13204 having a set of (at least one) program module 13205. Such program module 13205 includes but not limited to: an operating system, one or more applications, other program modules, and program data. Each of these examples or some combination of them may include an implementation of a network environment.

The bus 1330 may be represented as one or more of several types of bus structures, including a storage unit bus or a storage unit controller, a peripheral bus, a graphics acceleration port, a processing unit, or a local bus using any bus structure of a plurality of bus structures.

The electronic device 1300 may also communicate with one or more external devices 1340 (e.g. a keyboard, a pointing device, a bluetooth device, etc.), may also communicate with one or more devices that enable a user to interact with the electronic device 1300, and/or communicate with any device (e.g., a router, a modem, etc.) that enables the electronic device 1300 to communicate with one or more other computing devices. Such communication may be performed through an input/output (I/O) interface 1350. Moreover, the electronic device 1300 may also communicate with one or more networks (e.g., a local area network (LAN), a wide area network (WAN), and/or a public network, such as the Internet) through the network adapter 1360. As shown in the drawing, the network adapter 1360 communicates with other modules of electronic device 1300 through the bus 1330. It should be understood that although not shown in the drawing, other hardware and/or software modules may be used in combination with electronic device 1300, including but not limited to: microcode, device drivers, redundant processing units, external disk drive arrays, RAID systems, tape drives, and data backup storage systems, etc.

Through the description of the above embodiments, those skilled in the art would easily understand that the example implementations described here may be implemented by software, or may be implemented by software in combination with necessary hardware. Therefore, the technical solution according to the embodiments of the present disclosure may be embodied in the form of a software product, and the software product may be stored in a non-volatile storage medium (which may be a CD-ROM, a USB flash disk, a mobile hard disk, etc.) or on a network, including several instructions to enable a computing device (which may be a personal computer, a server, a terminal device, or a network device, etc.) to perform the method according to the embodiments of the present disclosure.

In some embodiments of the present disclosure, there is further provided a computer-readable storage medium, and a program product capable of implementing the method described in the description is stored on the computer-readable storage medium. In some possible implementations, various aspects of the present disclosure may also be implemented in the form of a program product, which includes a program code. When the program product runs on the terminal device, the program code is used to enable the terminal device to perform the steps according to various exemplary embodiments of the present disclosure described in the above "exemplary method" part of the present description.

The program product for implementing the above method according to an embodiment of the present disclosure may employ a portable compact disk read-only memory (CD-ROM) and includes program code, and may run on a terminal device, such as a personal computer. However, the program product of the present disclosure is not limited to this. In the context, the readable storage medium may be any tangible medium including or storing a program, and the program may be used by or combined with an instruction execution system, apparatus, or device.

The program product may employ any combination of one or more readable medium. The readable medium may be a readable signal medium or a readable storage medium. The readable storage medium may be, for example, but not limited to, an electrical, magnetic, optical, electromagnetic, infrared, or semiconductor system, apparatus, or device, or any combination of them. More specific examples (non-exhaustive lists) of the readable storage medium include: an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of them.

The computer-readable signal medium may include data signals that are propagated in a baseband or as part of a carrier, where the readable program code is carried. Such propagated data signals may take a variety of forms, including, but not limited to: electromagnetic signals, optical signals, or any suitable combination of them. The readable signal medium may also be any readable medium other than the readable storage medium, and the readable medium may send, propagate, or transmit a program for use by or in connection with an instruction execution system, apparatus, or device.

The program code included on the readable medium may be transmitted with any suitable medium, including but not limited to wireless, wired, optical cable, RF, etc., or any suitable combination of the above.

Program code for performing the operations of the present disclosure may be written in any combination of one or more programming languages, including object-oriented programming languages, such as Java, C++, etc., also including conventional procedural programming languages, such as "C" languages or similar programming languages. The program code may be executed entirely on the user computing device, partly on the user device, as a stand-alone software package, partly on the user computing device and partly on the remote computing device, or entirely on the remote computing device or server. In situations involving a remote computing device, the remote computing device may be connected to a user computing device through any type of network, including a local area network (LAN) or a wide area network (WAN), or may be connected to an external computing device (e.g., to be connected through the Internet utilizing an Internet service provider).

In addition, the above drawings are merely illustrative of the processes included in the method according to the exemplary embodiments of the present disclosure, and are not intended to be limiting. It is easy to understand that the processes shown in the above drawings do not indicate or limit the temporal sequence of these processes. In addition, it is also easy to understand that these processes may be performed synchronously or asynchronously in a plurality of modules.

Other embodiments of the present disclosure will be apparent to those skilled in the art from consideration of the description and practice of the present disclosure. The present disclosure is intended to cover any variations, uses, or adaptations of the present disclosure following the general principles of the present disclosure and including common general knowledge or conventional technical means in the art not disclosed in the present disclosure. The description and embodiments are only considered as examples, and the true scope and concept of the present disclosure is indicated by the claims.

INDUSTRIAL APPLICABILITY

According to the technical solution provided by the present disclosure, it is determined whether to issue the order to be processed to the picking pool according to the production end time and the production period, so as to determine the manner of assigning the order to be processed to a picking terminal; there is no need for human participation in production rhythm adjustment, which is beneficial to improving the outbound efficiency of the warehouse order. In addition, the binding relationship between the task assignment and the picking link is decoupled; the task priority can be adjusted in the task assignment and picking link according to the real-time order condition, which improves the production timeliness of the order to be processed.

What is claimed is:

1. A method for processing a warehouse order task, performed by an electronic device, and comprising:
    determining, according to order information in a warehouse management system, a production end time of an order to be processed
    and a production period of a batch task that the order to be processed belongs to;
    in response to the production end time not belonging to the production period, determining not to issue the order to be processed to the picking pool, and assigning the order to be processed to a picking terminal according to a backlog quantity of orders to be outbound and an outbound productivity; or
    in response to the production end time belonging to the production period, determining to issue the order to be processed to the picking pool, and assigning the order to be processed to a picking terminal according to an order quantity of the batch task and a batch completion efficiency, to automatically perform automatic task issuance and improve an intelligence and automation level of warehouse operations.

2. The method for processing a warehouse order task according to claim 1, further comprising:
    obtaining attribute information of an order fed back by a client, the attribute information comprising at least one of a manner of production, a production requirement, and a storage location encoding of an article in the order in a warehouse; and
    generating the order to be processed according to the attribute information.

3. The method for processing a warehouse order task according to claim 1, further comprising:
    determining an order to be processed that is placed in a storage location and assigned to the picking pool as a first type order;
    determining an order to be processed that is placed in a storage location and not assigned to the picking pool as a second type order; and
    determining that a picking priority of the first type order is higher than a picking priority of the second type order.

4. The method for processing a warehouse order task according to claim 1, wherein determining not to issue the order to be processed to the picking pool, and assigning the order to be processed to a picking terminal according to a backlog quantity of orders to be outbound and an outbound productivity comprises:
    determining a maximum quantity of reviewed orders;
    determining an assignable quantity according to the backlog quantity of orders to be outbound and the maximum quantity of the reviewed orders; and
    assigning the order to be processed to the picking terminal according to the assignable quantity and the outbound productivity.

5. The method for processing a warehouse order task according to claim 1, further comprising:
    determining location information of a storage location where the picking terminal is located;
    predicting a picking path of the picking terminal according to the location information; and
    assigning the order to be processed of the picking path to the picking terminal.

6. The method for processing a warehouse order task according to claim 4, wherein assigning the order to be processed to the picking terminal according to the assignable quantity and the outbound productivity comprises:
    determining a first quantity of the order to be processed of the storage location;
    determining whether the first quantity is less than or equal to the assignable quantity;
    in response to determining that the first quantity is less than or equal to the assignable quantity, assigning the order to be processed of the storage location to the picking terminal;
    in response to determining that the first quantity is greater than the assignable quantity, assigning the order to be processed to the picking terminal according to the production end time;
    in response to determining that the first quantity is greater than the assignable quantity, and production end times of a plurality of orders to be processed are the same, assigning the order to be processed to the picking terminal according to an article quantity in the order to be processed; and
    in response to determining that the first quantity is greater than the assignable amount, production end times of a plurality of orders to be processed are the same, and article quantities in a plurality of orders to be processed are the same, assigning the order to be processed to the picking terminal according to an order receiving time of the order to be processed.

7. The method for processing a warehouse order task according to claim 4, wherein determining to issue the order to be processed to the picking pool, and assigning the order to be processed to a picking terminal according to an order quantity of the batch task and the batch completion efficiency comprises:
    determining a backlog quantity of the batch task;
    determining a duration of the batch task according to the production period;
    determining the batch completion efficiency according to a historical record of the batch task;
    determining a quantity of batch picking terminals required for performing the batch task according to the backlog quantity, the duration and the batch completion efficiency of the batch task;
    determining a quantity of all picking terminals in an idle state;
    determining a proportion between the quantity of the batch picking terminals and the quantity of all picking terminals;
    selecting a picking terminal in an idle state at intervals in a storage location channel as a batch picking terminal according to the proportion; and
    assigning the order to be processed to the batch picking terminal.

8. The method for processing a warehouse order task according to claim 1, wherein assigning the order to be processed to a picking terminal comprises:
- determining picking attribute information of the order to be processed, where the picking attribute information comprising at least one of a storage location to be picked, an article name and an article quantity; and
- sending the picking attribute information to the picking terminal.

9. An electronic device, comprising:
- a memory; and
- a processor, coupled to the memory, wherein the processor is configured to, based on an instruction stored in the memory, cause the electronic device to:
- determine, according to order information in a warehouse management system, a production end time of an order to be processed;
- and a production period of a batch task that the order to be processed belongs to;
- in response to the production end time not belonging to the production period, determine not to issue the order to be processed to the picking pool, and assign the order to be processed to a picking terminal according to a backlog quantity of orders to be outbound and an outbound productivity; and
- in response to the production end time belonging to the production period, determine to issue the order to be processed to the picking pool, and assign the order to be processed to a picking terminal according to an order quantity of the batch task and a batch completion efficiency, to automatically perform automatic task issuance and improve an intelligence and automation level of warehouse operations.

10. A computer-readable storage medium, with a program stored thereon, wherein when the program is executed by a processor, a method for processing a warehouse order task is implemented; wherein the method comprises:
- determining, according to order information in a warehouse management system, a production end time of an order to be processed;
- and a production period of a batch task that the order to be processed belongs to;
- in response to the production end time not belonging to the production period, determining not to issue the order to be processed to the picking pool, and assigning the order to be processed to a picking terminal according to a backlog quantity of orders to be outbound and an outbound productivity; and
- in response to the production end time belonging to the production period, determining to issue the order to be processed to the picking pool, and assigning the order to be processed to a picking terminal according to an order quantity of the batch task and a batch completion efficiency.

11. The method for processing a warehouse order task according to claim 2, further comprising:
- determining location information of a storage location where the picking terminal is located;
- predicting a picking path of the picking terminal according to the location information; and
- assigning the order to be processed of the picking path to the picking terminal.

12. The method for processing a warehouse order task according to claim 3, further comprising:
- determining location information of a storage location where the picking terminal is located;
- predicting a picking path of the picking terminal according to the location information; and
- assigning the order to be processed of the picking path to the picking terminal.

13. The method for processing a warehouse order task according to claim 4, further comprising:
- determining location information of a storage location where the picking terminal is located;
- predicting a picking path of the picking terminal according to the location information; and
- assigning the order to be processed of the picking path to the picking terminal.

14. The method for processing a warehouse order task according to claim 2, wherein assigning the order to be processed to a picking terminal comprises:
- determining picking attribute information of the order to be processed, where the picking attribute information comprising at least one of a storage location to be picked, an article name and an article quantity; and
- sending the picking attribute information to the picking terminal.

15. The method for processing a warehouse order task according to claim 3, wherein assigning the order to be processed to a picking terminal comprises:
- determining picking attribute information of the order to be processed, where the picking attribute information comprising at least one of a storage location to be picked, an article name and an article quantity; and
- sending the picking attribute information to the picking terminal.

16. The method for processing a warehouse order task according to claim 4, wherein assigning the order to be processed to a picking terminal comprises:
- determining picking attribute information of the order to be processed, where the picking attribute information comprising at least one of a storage location to be picked, an article name and an article quantity; and
- sending the picking attribute information to the picking terminal.

17. The method for processing a warehouse order task according to claim 1, further comprising:
- in response to the production end time not belonging to the production period, determining an assignable quantity of orders according to an order backlog quantity in the production process.

* * * * *